United States Patent [19]

Sheldrake et al.

[11] 4,310,793

[45] Jan. 12, 1982

[54] CHARGE/FLOAT MOTOR VEHICLE ELECTRICAL SYSTEM

[75] Inventors: Leonard J. Sheldrake, Noblesville; Stanley E. Olson, Spencer; Philip A. Karau, Anderson, all of Ind.

[73] Assignee: General Motors Corporation, Detroit, Mich.

[21] Appl. No.: 153,278

[22] Filed: May 27, 1980

[51] Int. Cl.³ .............................................. H02J 7/14
[52] U.S. Cl. ....................................... 322/28; 320/37; 320/64; 320/23; 322/73
[58] Field of Search .................................. 320/22–24, 320/31, 32, 39, 61, 64, 68, 35, 36, 37, 38; 322/28, 60, 73

[56] References Cited

U.S. PATENT DOCUMENTS

| | | |
|---|---|---|
| 1,868,046 | 7/1932 | Cole. |
| 2,621,316 | 12/1952 | Lamm et al. ............... 320/10 |
| 3,568,031 | 3/1971 | Eberts ....................... 320/61 X |
| 3,585,482 | 6/1971 | Zelina ....................... 320/22 X |
| 3,600,661 | 8/1971 | Briggs et al. ............... 320/35 |
| 3,794,905 | 2/1974 | Long ......................... 320/39 X |
| 3,895,282 | 7/1975 | Foster et al. ............... 320/39 X |
| 3,904,948 | 9/1975 | Earle ......................... 320/39 X |
| 4,061,956 | 12/1977 | Brown et al. ............... 320/22 |
| 4,128,799 | 12/1978 | Morishima ................... 322/28 |
| 4,136,311 | 1/1979 | Scheidler ................... 320/64 X |
| 4,233,553 | 11/1980 | Prince et al. ............... 320/23 |

OTHER PUBLICATIONS

"Circuitry Senses Battery State, Adjusts Charge Voltage", *Design News*, Aug. 22, 1977, p. 57.

*Primary Examiner*—Robert J. Hickey
*Attorney, Agent, or Firm*—Mark A. Navarre

[57] ABSTRACT

A motor vehicle electrical system having a charge mode of operation wherein the motor vehicle battery receives charging current at a temperature compensated voltage from an engine-driven generator, and a float mode operation wherein the battery charging current is reduced to a low value, sufficient only to prevent self-discharge of the battery. The charge and float modes of operation are alternately engaged as a function of the battery state of charge. During the charge mode of operation, a sufficiently high state of charge is detected as a function of the magnitude of the charging current, and during the float mode of operation, a depleted state of charge is detected as a function of the battery voltage. A timer provides a periodic return to the charge mode of operation to sample the battery state of charge.

2 Claims, 2 Drawing Figures

U.S. Patent   Jan. 12, 1982   4,310,793
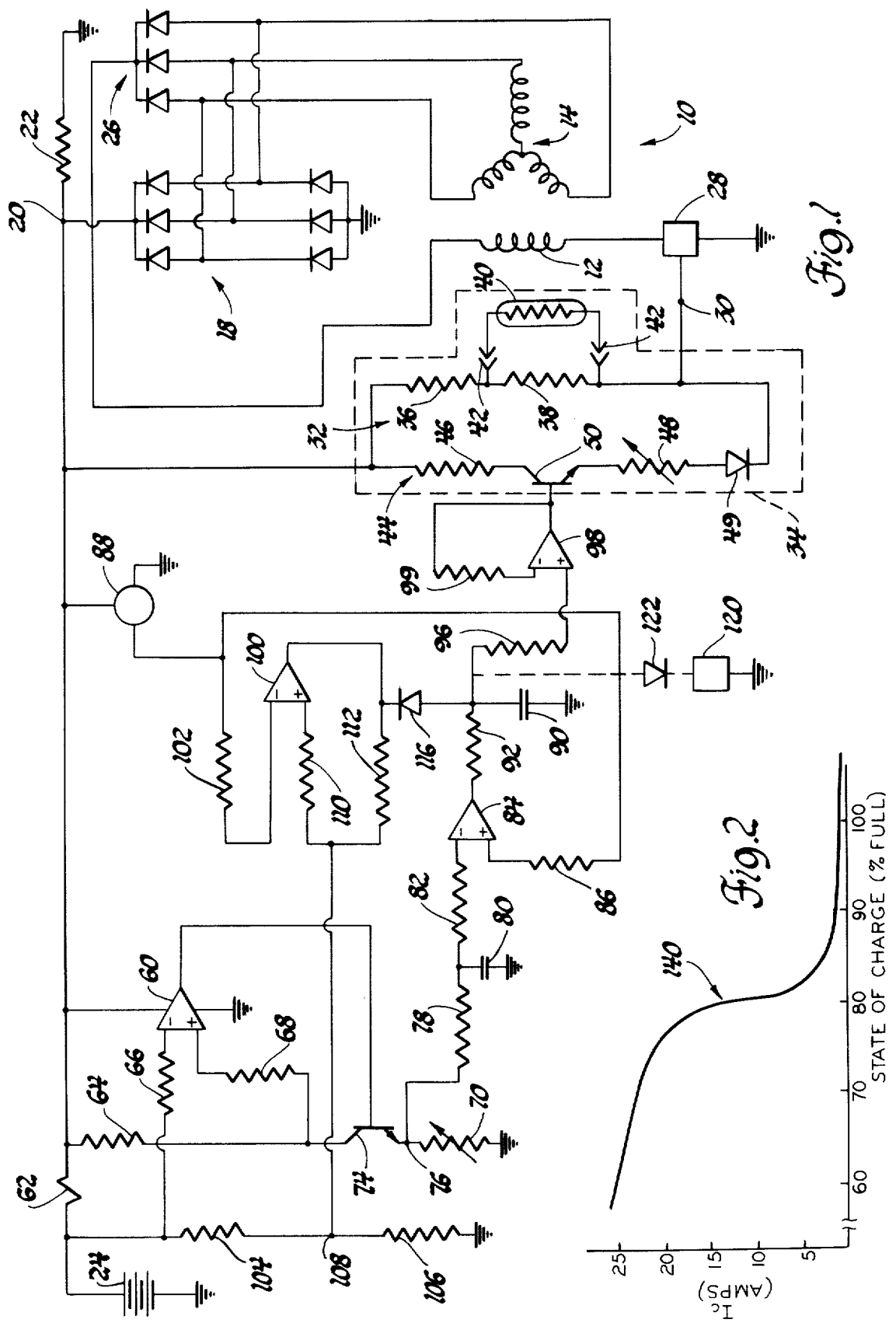

CHARGE/FLOAT MOTOR VEHICLE ELECTRICAL SYSTEM

This invention relates to vehicular battery charging systems and more particularly to a charge/float charging system regulated in accordance with the state of charge of the battery.

In a conventional vehicular electrical system, an engine-driven generator develops electricity for supplying power to the electrical loads of the vehicle and for charging the vehicle storage battery. A voltage regulator sensitive to the generator output voltage and the underhood ambient temperature varies the excitation of the generator field winding to adjust the output voltage of the generator in a manner to maintain the battery in a charged condition. Since the charging voltage required to maintain the battery at a given charge condition varies as a function of the battery temperature, the voltage regulator typically includes a temperature sensitive element such as a thermistor for compensating the voltage output of the generator as a function of the battery temperature. In a 12-volt electrical system, for example, 13 volts may be a sufficient charging voltage at 20° C. while 14.7 volts may be needed at 0° C. in order to maintain an equivalent charging rate.

A shortcoming of the above described system is that the output voltage of the generator is not directly controlled as a function of the state of charge of the battery. As the battery approaches a full state of charge, it continues to accept a significantly high charging current from the generator without appreciably increasing the energy stored in the battery. As a result, charging current supplied to a battery having a nearly full state of charge is essentially wasted. This inefficiency is compounded by the less than ideal efficiency of the automotive generator.

A further shortcoming of the conventional motor vehicle electrical system is that the output voltage of the generator is applied to the various electrical loads of the vehicle in addition to charging the storage battery. As a result, the electrical loads (which are designed to operate at the nominal voltage of the electrical system) consume an excessive amount of power when the generator output voltage exceeds the nominal voltage of the system. Also, the increased generator output voltage decreases the life expectancy of many of the electrical loads, such as the headlamps.

It is therefore an object of this invention to provide an improved motor vehicle electrical system wherein the storage battery is maintained at a desired state of charge and wherein energy consumption in the electrical loads of the motor vehicle is reduced to a minimum.

It is another object of this invention to provide an improved motor vehicle electrical system operated in accordance with a first control schedule wherein an engine-driven generator charges the motor vehicle storage battery at a conventional rate, or a second control schedule wherein the generator supplies power to the motor vehicle electrical loads but does not significantly charge the storage battery, the first and second schedules being alternately engaged as a function of the state of charge of the battery.

It is a further object of this invention to provide an improved motor vehicle electrical system having an engine-driven generator for supplying charging current to a motor vehicle storage battery wherein the output voltage of the generator is compensated as a function of the temperature of the battery electrolyte and wherein the charging current supplied to the battery is measured to provide an indication of the state of charge of the battery for controlling the battery charging rate.

These objects are carried forward by alternately engaging a charge mode of operation wherein the motor vehicle battery receives a large charging current from an engine-driven generator and a float mode of operation wherein the battery charging current is reduced to a low value, sufficient only to prevent self-discharge of the battery. The output voltage of the generator is compensated as a function of the temperature of the battery electrolyte during the charge mode so that the charging current may be measured to provide an indication of the state of charge of the battery. When the battery attains a nearly full state of charge (about 80%), the charging current decreases below a reference value indicative of the above-mentioned state of charge, and the float mode is engaged, reducing the generator output voltage to a suitable float value (about 12.8 volts for a nominal 12 volt system). The motor vehicle electrical system remains in the float mode until the battery terminal voltage decreases significantly below the float voltage, whereupon the charge mode is reengaged to return the battery state of charge to the nearly full level.

A further embodiment includes a timer for periodically engaging the charge mode in order to sample the state of charge of the battery.

The term "generator" as used herein refers generically to a mechanically driven source of direct current, such as a direct current generator or an alternator having a rectified direct current output voltage. The term "state of charge" as used herein refers to the quantity of energy stored in a battery that may be delivered to an electrical load. It will be appreciated that the battery state of charge as so defined may be determined by completely discharging the battery into an electrical load while measuring the power (in ampere-hours) transferred to the load.

IN THE DRAWINGS

FIG. 1 is a circuit diagram of a motor vehicle electrical system made in accordance with this invention.

FIG. 2 is a graph of battery charging current verses battery state of charge.

Referring now to FIG. 1, reference numeral 10 generally designates an automotive generator for supplying charging current to battery 24 and for supplying power to the motor vehicle electrical loads 22. Generator 10 is illustrated as an alternator having an engine-driven field winding 12 and a WYE-connected stator winding 14. When field winding 12 is excited with direct current, stator winding 14 develops an alternating current voltage which is rectified by bridge rectifier 18. Output terminal 20 of bridge rectifier 18 is connected to supply power to electrical loads 22. Diode trio 26 provides a source of direct current for exciting field winding 12 in accordance with the switching action of voltage regulator 28. Voltage regulator 28 operates in a conventional manner to control the excitation of field winding 12 in accordance with the voltage applied to sense terminal 30. As the voltage applied to terminal 30 decreases, the excitation of field winding 12 is increased to increase the output voltage at terminal 20. Similarly, as the voltage applied to terminal 30 increases, the excitation of field winding 12 is decreased to decrease the generator output voltage at terminal 20. The voltage regulator 28 may also include means for initially exciting field winding 12 when the motor vehicle engine is started. A voltage regulator meeting the above specifications is more completely described in the U.S. Pat. No. to Harland, Jr. et al 3,539,864. More specifically, terminal 30 disclosed herein corresponds to terminal 107 as shown in FIG. 1 of the Harland, Jr. et al patent.

The voltage applied to sense terminal 30, and hence the output voltage of a generator 10, is determined as a function of the voltage drop across resistance network 34. Network 34 comprises two parallel circuit paths between storage battery 24 and sense terminal 30. The first parallel path is generally designated by reference numeral 32 and comprises serially connected resistors 36 and 38, and thermistor 40 connected in parallel with resistor 38. Thermistor 40, which has a negative temperature coefficient of resistance, is remotely located in a manner to sense the temperature of the electrolyte in battery 24 and is connected to resistor 38 as shown through connectors 42. Preferably, thermistor 40 is placed in a cavity of battery 24 so as to be submerged in the battery electrolyte. Such an arrangement is described more fully in the U.S. Pat. No. to Rady 2,421,523. As will be appreciated by those skilled in the art, the resistivity of thermistor 40 will therefore vary as a function of the temperature of the electrolyte in storage battery 24. Specifically, its resistivity decreases with increasing battery temperature and increases with decreasing battery temperature. In this way, parallel path 32 of network 34 tends to increase the voltage applied to sense terminal 30 as the temperature of battery 24 increases, and to decrease the voltage applied to terminal 30 as the temperature of battery 24 decreases. The second parallel path of network 34 is generally designated by reference numeral 44, and comprises resistors 46 and 48, diode 49, and a transistor 50 for selectively completing the circuit. When transistor 50 is conductive, serially connected resistors 46 and 48 are connected in parallel with network circuit path 32; when transistor 50 is not conductive, resistors 46 and 48 are essentially open circuited.

In the charge mode of operation, transistor 50 is non-conductive so that the voltage applied to terminal 30 of voltage regulator 28 is determined as a function of the voltage drop across circuit path 32 of network 34. The voltage thereby applied to terminal 30 causes the output of generator 10 to assume a desired charging voltage such as 14.5 volts, depending on the battery temperature. To engage the float mode, transistor 50 is biased to a conductive state so that the voltage applied to sense terminal 30 varies as a function of the voltage drop across the parallel combination of circuits 32 and 44 of network 34. Resistors 46 and 48 are chosen so that during the float mode of operation, changes in the resistance of thermistor 40 have only a minor influence on the voltage applied to sense terminal 30. When transistor 50 is biased to a conductive state, the voltage applied to terminal 30 therefore increases to a voltage determined essentially as a function of the terminal voltage of battery 24 and the resistance of parallel circuit 32. The voltage thereby applied to sense terminal 30 causes the output of generator 10 to assume a float voltage (about 12.8 volts for a nominal 12 volt electrical system). Diode 49 prevents reverse conduction through the emitter-base circuit of transistor 50, as the internal circuitry of the voltage regulator 28 tends to maintain a DC bias voltage at sense terminal 30. Resistor 48 is illustrated as a variable resistor for adjusting the float voltage appearing at terminal 20.

As explained above, the output voltage of generator 10 represents the charging voltage for battery 24, and the charging voltage is compensated in the charge mode as a function of the battery electrolyte temperature. This invention recognizes that under these conditions the charging current supplied to battery 24 may be measured as an indication of the state of charge of battery 24. This is due to the inherent charging characteristic of lead-acid batteries depicted graphically in FIG. 2. FIG. 2 generally depicts the charging characteristics (charging current (Ic) vs. state of charge) of a 12-volt lead-acid battery such as a Delco Freedom Battery, manufactured by Delco-Remy Division of General Motors Corporation. The charging voltage applied to the battery is compensated as a function of the battery temperature, and it will be seen from the graph that over a limited range of charging current (7 amps–13 amps), the state of charge remains relatively constant as indicated by reference numeral 140. This characteristic occurs at approximately 80% state of charge, 100% state of charge being defined as the point at which the battery is capable of delivering its rated energy content in ampere-hours. It has been found that although different batteries have slightly different charging characteristics, the phenomenon referred to above (indicated by reference numeral 140) consistently occurs at approximately 80% state of charge in conventional lead-acid batteries. As will be described, operational amplifier 60 is connected in a manner to compare the charging current supplied to battery 24 during the charge mode of operation with a reference value indicative of the above-mentioned state of charge.

Charging current shunt 62, which is a resistor having a low resistance value, is connected in series between output terminal 20 of bridge rectifier 18 and the positive terminal of battery 24. The voltage drop across shunt 62, which is directly proportional to the charging current supplied to battery 24, is applied through resistors 64, 66 and 68 to the plus and minus input terminals of operational amplifier 60 as shown. Specifically, the generator side of shunt 62 is connected through resistors 64 and 68 to the plus input, and the battery side of shunt 62 is connected through resistor 66 to the minus input. Resistor 64 is also connected in series with resistor 70 through the collector-emitter circuit of transistor 74 to form a voltage divider. The output voltage of operational amplifier 60 is connected to the base terminal of transistor 74 so that the voltage potential at divider terminal 76 varies as a function of the charging current supplied to battery 24 through shunt 62. The voltage at terminal 76 charges capacitor 80 through resistor 78, and the capacitor voltage is applied to the minus input of operational amplifier 84 through input resistor 82. As will be appreciated, capacitor 80 operates to filter the input voltage applied to operational amplifier 84 to prevent transient switching. The plus input of operational amplifier 84 is connected through input resistor 86 to a reference voltage supplied by reference source 88. Reference source 88 is a standard device and operates in a well known manner to provide a precise reference voltage; one such device being the AD 580 voltage regulator, manufactured by Analog Devices, Inc., Norwood, Mass. Operational amplifier 84 functions as a comparator, its output voltage being high when the voltage applied to its plus input terminal exceeds the voltage applied to its minus input terminal. When in the high state, operational amplifier 84 charges capacitor 90 through resistor 92. Conversely, the output of operational amplifier 84 assumes a low or ground potential to discharge capacitor 90 through resistor 92 when the voltage applied to its minus input terminal exceeds that applied to its plus input terminal. As long as the charging current through shunt 62 exceeds a value corresponding to the reference voltage applied to the plus input terminal of operational amplifier 84, the output of operational amplifier 84 remains low to maintain capacitor 90 discharged. When the charging current decreases below a value corresponding to the reference voltage, the output of operational amplifier 84 goes to a high state to charge capacitor 90. The ungrounded terminal of capacitor 90 is connected through input resistor 96 to the plus input of operational amplifier 98, the output of which is connected to the base terminal of transistor 50. It will be appreciated by those skilled in the art that operational amplifier 98 and feedback resistor 99 function as a buffer for biasing transistor 50 on and off in accordance with the voltage across capacitor 90. The reference voltage provided by reference source 88 is chosen so that the output level of operational amplifier 84 changes from a low state to a high state when the charging current through shunt 62 decreases to a value associated with the predetermined battery state of charge depicted by reference numeral 140 in FIG. 2. When the above condition occurs, transistor 50 is rendered conductive to engage the float mode of operation.

Operational amplifier 100 is connected to monitor the voltage of battery 24 in the float mode of operation. The reference voltage provided by reference source 88 is connected through resistor 102 to the minus input of operational amplifier 100. Resistors 104 and 106 form a voltage divider for providing a voltage at terminal 108 that is directly proportional to the battery voltage. Terminal 108 is connected to the plus input of operational amplifier 100 through input resistor 110, and feedback resistor 112 is connected between the output terminal of operational amplifier 100 and terminal 108. The output voltage of operational amplifier 100 assumes a low or ground potential when the voltage applied to its minus input terminal exceeds the voltage applied to its plus input terminal. In this state, capacitor 90 is discharged by operational amplifier 100 through diode 116 to render transistor 50 non-conductive. Conversely, the output voltage of operational amplifier 100 assumes a high voltage when the voltage applied to its plus input terminal exceeds that applied to its minus input terminal. Resistors 104, 106, 110 and 112 are chosen so that when the terminal voltage of battery 24 equals or exceeds the float voltage, the output of operational amplifier 100 is maintained in the high state, ineffective to discharge capacitor 90. Under such conditions, resistor 112 is effectively connected in parallel with resistor 104. The various resistances are chosen so that operational amplifier 100 will change to the low state when the voltage of battery 24 decreases significantly below the float voltage—to approximately 12.4 volts according to the preferred embodiment. Once the output of operational amplifier 100 assumes a low level (engaging the charge mode), resistor 112 is effectively connected in parallel with resistor 106. Resistances 104, 106 and 112 are chosen so that in this configuration, a battery terminal voltage of 14 volts or so is required to change the output state of operational amplifier 100 to its low state. It will be appreciated that the above described input resistance arrangement gives the voltage sensing circuitry a hysteresis characteristic effective to maintain the motor vehicle electrical system in the charge mode at least until operational amplifier 84 changes state in response to an increased charging current from generator 10.

Optionally, timer 120 and diode 122 may be connected as shown in dashed lined in order to provide a periodic return to the charge mode of operation. Timer 120 is preferably a standard device such as the MC 555 timer, manufactured by Motorola Semiconductor Corporation, operative to periodically connect an input terminal to ground potential. Specifically, timer 120 periodically (once every 10 minutes, for example) discharges capacitor 90 to engage the charge mode of operation. If the charging current through shunt 62 is sufficient to drive the output of operational amplifier 84 to its ground state, the motor vehicle electrical system remains in the charge mode of operation until operational amplifier 84 is returned to its high state (engaging the float mode). If, on the other hand, the charging current is insufficient to switch the output of operational amplifier 84 to its low state, the motor vehicle electrical system returns to the float mode of operation.

Although this invention has been described in reference to specific embodiments, it will be appreciated that various modifications may be made thereto without departing from its scope which is set forth in the following claims.

The embodiments of the invention in which an exclusive property or privilege is claimed are defined as follows:

1. A motor vehicle electrical system that is operative to provide alternate charge and float modes of operation for charging the storage battery comprising:
   engine-driven electric generator means having an energizable field winding for controlling the output voltage of said generator means;
   a storage battery;
   conductor means connecting said storage battery across the output terminals of said generator means whereby said storage battery is charged by said generator;
   at least one electrical load connectable across said conductor means;
   voltage regulating means connected to said field winding for controlling the energization of the field winding, said voltage regulating means comprising a voltage sensing circuit being responsive to the voltage across said conductor means and having first and second alternately engageable states, said first state corresponding to a battery charge mode of operation wherein said voltage sensing circuit controls the voltage regulator in a manner to maintain a substantially constant regulated output voltage from said generator which is higher than the terminal voltage of said battery, and said second state corresponding to a float mode of operation wherein said voltage sensing circuit controls the voltage regulator in a manner to reduce the regulated output voltage of said generator to a lower value, said voltage sensing circuit including means effective during said charge mode of operation for varying said regulated voltage as a function of battery electrolyte temperature;
   current sensing means for sensing battery charging current;
   control means responsive to said current sensing means, said control means being effective during said battery charge mode of operation to engage said second state of said voltage sensing circuit when the charging current supplied to the battery drops below a first reference level corresponding to a high state of charge of said battery; and timer means for periodically engaging said first state of said voltage sensing circuit, whereby said charge mode of operation is periodically engaged to sample the state of charge of said battery.

2. A motor vehicle electrical system comprising in combination:

a storage battery;

an engine-driven generator connected to said storage battery for supplying charging current thereto, and connected to motor vehicle electrical loads for supplying power thereto, said generator having electrically energizable means for adjusting its output voltage;

first control means including means sensing the output voltage of said generator for controlling the energization of said electrically energizable means according to a first schedule, said first schedule corresponding to a charge mode of operation wherein said electric generator supplies charging current to said battery and to said electrical loads, and wherein the output voltage of said electric generator is maintained at a regulated value as a function of the temperature of said battery;

second control means including means sensing the output voltage of said generator, effective when engaged to control the energization of said electrically energizable means according to a second schedule, said second schedule corresponding to a float mode of operation wherein the output voltage of said generator is regulated to a lower value substantially corresponding to the nominal terminal voltage of said battery, whereby said electrical loads are energized at said lower value of voltage for reduced power consumption;

comparator means effective during said charge mode of operation to compare the magnitude of the charging current supplied to said battery to a value of charging current supplied to said battery during said charge mode of operation that is associated with a substantially charged condition of said battery;

means responsive to said comparator for engaging said second control means when said charging current decreases below said reference value; and timer means for periodically disengaging said second control means to return the electrical system to said charge mode of operation whereby said storage battery is periodically returned to said substantially charged condition.

* * * * *